United States Patent [19]
Carney et al.

[11] 3,944,758
[45] Mar. 16, 1976

[54] TALK LINE MULTIPLE COMMUNICATION AND TEST APPARATUS

[75] Inventors: William V. Carney, Valley Stream; Paul V. DeLuca, Port Washington, both of N.Y.

[73] Assignee: Porta Systems Corporation, Syosset, N.Y.

[22] Filed: Oct. 13, 1971

[21] Appl. No.: 188,722

[52] U.S. Cl. ............. 179/175; 179/1 H; 179/1 PC; 339/270 R
[51] Int. Cl.² ...................... H04M 3/22; H01R 7/06
[58] Field of Search ....... 179/1 SW, 1 B, 1 H, 1 PC, 179/175, 175.1 R; 339/39, 266 R, 270 R, 92 M

[56] References Cited
UNITED STATES PATENTS

| | | | |
|---|---|---|---|
| 330,119 | 11/1885 | Holden | 85/71 |
| 1,349,977 | 8/1920 | Mulkern | 85/71 |
| 1,810,687 | 6/1931 | Taylor | 339/44 M |
| 2,468,911 | 5/1949 | Aiken | 179/1 H |
| 2,535,031 | 12/1950 | Beatty | 339/39 |
| 2,889,401 | 6/1959 | Finkbeiner | 179/175 |
| 3,217,428 | 11/1965 | Spaulding | 179/1 B |
| 3,626,097 | 12/1971 | Bloom | 179/1 B |

*Primary Examiner*—Douglas W. Olms
*Attorney, Agent, or Firm*—Philip D. Amins

[57] ABSTRACT

A talk line multiple communication and test apparatus for use in conjunction with telephone central office frame equipment and comprising a housing, a face plate, and a standard type rotary switch member having a plurality of positions mounted on said face plate and said housing having at least one input and at least one output connector of the Amphenol type fixedly connected thereto and disposed therewithin, means for electrically connecting said rotary switch with respect to said input and output connectors, said input and output connectors being of the panel mount type and being adapted to receive a mating connector in mating engagement therewith, at least one input jack mounted on said face plate and means for electrically connecting said input jack to said rotary switch, and a bias connector clip member which is positionable between an interior wall of said housing and pairs of mated input and output connectors to maintain the same in mated engagement for secure and positive electrical connection, wherein said bias connector clip member comprises a substantially U-shaped member and an end cap member within which are positioned the free ends of the legs of said U-shaped member with a threaded bolt extending longitudinally through said U-shaped member to compress the legs of said U-shaped member to selectively regulate the bowing-out of said legs in order to preselect the bias force exerted upon said mated Amphenol type connectors.

7 Claims, 5 Drawing Figures

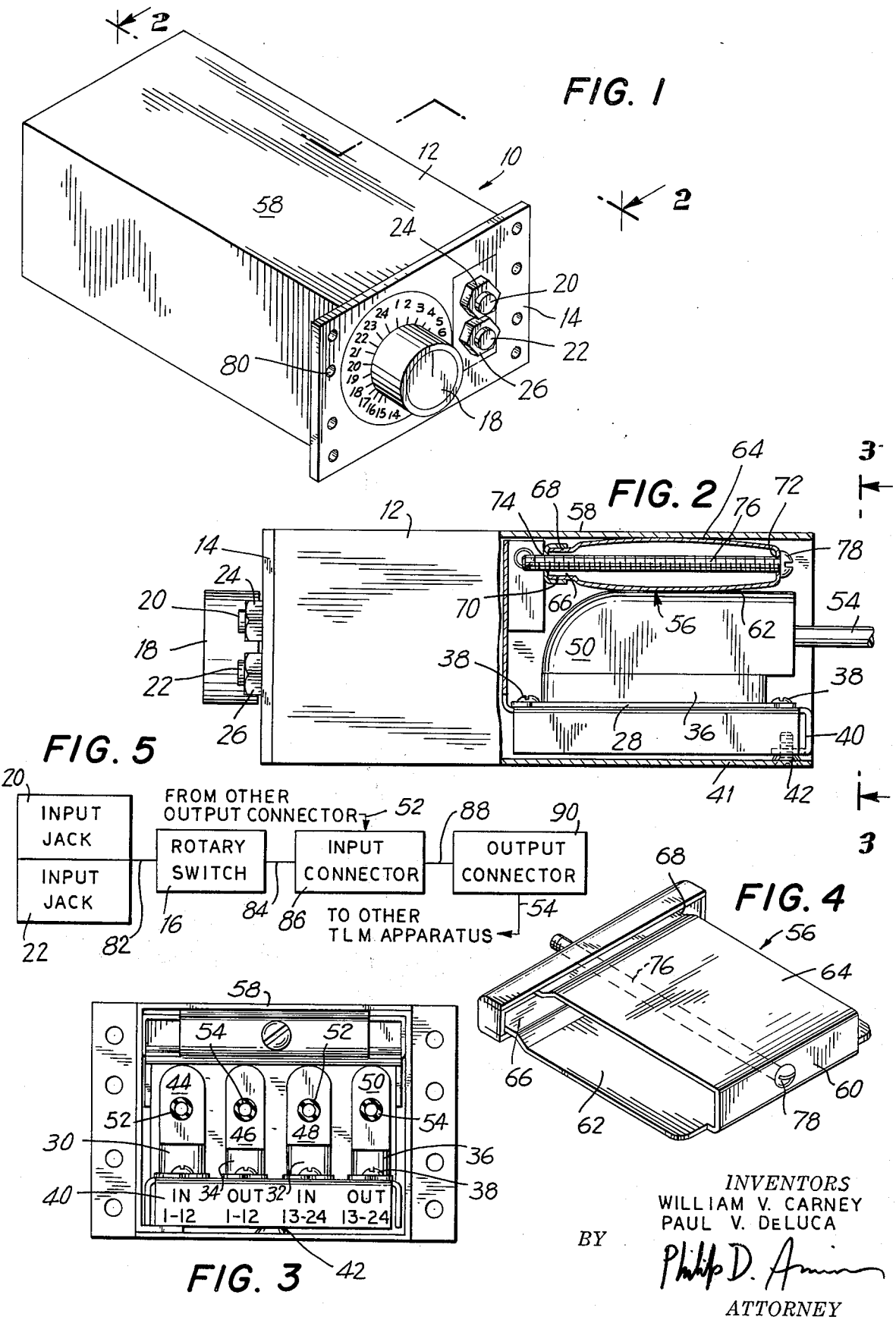

TALK LINE MULTIPLE COMMUNICATION AND TEST APPARATUS

BACKGROUND OF THE INVENTION

The present invention pertains to new and novel talk line multiple communication and test apparatus for use with telephone central office frame equipment.

Heretofore, central office frames employed singular talk line circuits whereby a plurality of individual talk line boxes were mounted next to one another at various spaced locations on the various type central telephone equipment frames, such as the main distribution frame, the outgoing trunk test frame, etc. Similarly, singular test line circuits were mounted next to one another. These types of talk line and test line installations required an appreciable amount of mounting space and thus, the number of talk and test lines available for intercommunication in the central telephone office were very limited.

SUMMARY OF THE INVENTION

Accordingly, it is the principal object of the present invention to provide a new and novel talk line multiple communication and test apparatus.

It is another object of the present invention to provide a talk line multiple apparatus which is compactly housed and requires a minimum of mounting space.

It is still a further object of the present invention to provide a talk line and test apparatus of the foregoing type which provides a multiplicity of separate circuits or talk lines all conveniently disposed within a singular housing of relatively small dimensions.

It is yet another object of the present invention to provide a talk line multiple communication and test apparatus of the aforementioned type employing Amphenol type connectors and wherein mating Amphenol type connectors are maintained in secured mated electrical engagement by a new and novel bias clip member of substantially U-shaped configuration.

BRIEF DESCRIPTION OF THE DRAWINGS

FIG. 1 is a perspective view of the talk line multiple communication and test apparatus of the present invention;

FIG. 2 is a sectional view of the apparatus of FIG. 1 taken on the line 2—2 thereof;

FIG. 3 is a rear view of the apparatus as viewed from the line 3—3 of FIG. 2;

FIG. 4 is a perspective view of the new and novel clip bias member employed in the apparatus; and FIG. 5 is an electrical block diagram of the apparatus of FIG. 1.

DETAILED DESCRIPTION OF THE PREFERRED EMBODIMENTS

Referring now to the drawings and, more particularly, to FIG. 1 thereof, there is shown a talk line multiple communication and test apparatus, generally designated by the reference numeral 10, and constructed pursuant to the principles of the present invention. The talk line apparatus 10 comprises a substantially rectangular backless housing 12, a face plate 14, a rotary switch member 16 (FIG. 5) which includes a switching knob 18 and a pair of input jacks 20 and 22. The jacks 20 and 22 comprise a single four wire input circuit, as will be discussed in more detail hereinafter.

The face plate 14 is secured with respect to the front of the housing 12 by means of the rotary knob 18 and by means of nuts 24 and 26 which readily engage the outwardly externally threaded portion of the input jacks 20 and 22 respectively.

Disposed within the housing 12 is a support shelf-like plate or member 28 upon which are mounted input Amphenol type connectors 30 and 32, and output Amphenol type connectors 34 and 36 with all of the Amphenol type connectors 30, 32, 34 and 36 being secured with respect to the shelf-like member 28 by means of threaded screws 38.

In the present embodiment, the talk line multiple communication and test apparatus 10 is provided with 24 separate and distinct talk or test channels, whereby the input connector 30 provides the inputs for 12 of these channels while the input connector 32 provides the input for the remaining 12 of these channels; with the output connector 34 providing the output for the first 12 channels and the output connector 36 providing the output connection for the last 12 channels. The wiring for interconnecting the input and output connectors is disposed beneath the shelf-like member 28 and these wires (not shown) are maintained in position by a rear protective cover member 40 which is secured with respect to the bottom wall 41 of the housing 12 by means of a screw 42, as best seen in FIG. 2. The Amphenol type connectors 30, 32, 34 and 36 are adapted to receive Amphenol type connectors 44, 46, 48 and 50, respectively, in mating engagement therewith. The connectors 44 and 48 have outer sheaths 52 within which are disposed the necessary wires for connection with the mated input connectors, while the connectors 46 and 50 have outer sheaths 54 within which are disposed the necessary wires for connection to the output connectors. These sheaths are diagramatically shown in FIG. 5 as the actual connections from and to other similar type talk line apparatuses 10, as will be explained in more detail hereinafter.

The mated pairs of Amphenol type connectors 30, 44; 32, 48; 34, 46 and 36, 50 are biased into secure mating engagement by means of a new and novel bias connector clip member 56 disposed between the upper portions of the connectors 44, 46, 48 and 50 and the interior of the upper wall portion 58 of the housing 12, as will now be discussed in detail. The bias connector clip member 56 is of substantially U-shaped configuration and includes a base portion 60 and a pair of leg members 62 and 64. The outwardly extending end portions of the legs 62 and 64 are inwardly crimped as at 66 and 68, so as to be easily positionably disposed within an end cap member 70 having a substantially hollow rectangular configuration, as best seen in FIG. 4. The base portion 60 of the bias connector clip member 56 is provided with a substantially centrally disposed opening 72 while the hollow end cap member 70 is provided with a substantially centrally disposed internally threaded opening 74, with the opening 72 and 74 being positioned in axial alignment. A threaded bolt member 76 having a slotted head portion 78 is insertable through the axial aligned opening 72 and 74 and threadedly engagable by the opening 74. Thus, rotational movement of the threaded bolt 76 by means of a screw driver or similar tool (not shown) engaging the slotted head 78 causes the bolt to exert an axial pressure on the legs 62 and 64 to either cause the height or spacing between said legs to increase or decrease, in dependence upon the spacing desired. This feature of providing adjustable spacing between said legs 62 and 64 enables the bias clip member 56 to exert the desired necessary biasing force upon the connectors 44, 46, 40 and 50 to maintain the same in secure mated connection with their corresponding connectors, as discussed previously hereinbefore, and as best seen in FIG. 3. In most cases, the configuration of the bias connector clip 56 and, more particularly, the legs 62 and 64 will be bowedout, as is diagramatically illustrated in FIG. 2, whereby there is a substantial downward force exerted upon the connector 50 to maintain the same in secure mated engagement with the connector 36.

As best seen in FIG. 4, the width of the leg 64 is less than that of the other leg 62, whereby the lateral ends of the leg 64 are disposed inwardly with respect to the lateral ends of the leg 62. This results in a structural configuration wherein it is very easy for an individual to insert and withdraw the bias connector clip 56 from the housing 12. More particularly, the aforesaid structural configuration permits individuals to simply and easily grasp the base portion 60 of the U-shaped bias connector clip member 56 and insert or remove the same from the housing 12. The bias force of the connector clip 56 may be adjusted while the same is disposed within or without the housing 12 by movement of the threaded bolt 76 as discussed hereinabove.

Referring now to FIGS. 1 and 3, the talk line multiple communication and test apparatus is adapted to be mounted upon the frame equipment (not shown) positioned within a central telephone office by having threaded screws or bolts (not shown) positioned within openings 80 in which, in turn, are disposed on either side of the fact plate 14. It will be apparent to those skilled in the art many of the individual apparatuses 10 are positioned or mounted upon the frame equipment at selected precise locations, so as to provide in the case of the present invention, 24 separate and distinct talk and test channels by means of a singular apparatus. In this regard, reference is now had to FIG. 5, which depicts the standard electrical block diagram of the apparatus 10 and the connection thereof to other similar types of apparatuses. The apparatus comprises input jacks 20 and 22 connected as a single four wire input with the output thereof being connected to the input of the rotary switch by means of a lead 82. The output of the rotary switch is connected by means of a lead 84 to an input connector box 86. It is herein to be noted that the input connector box 86 is diagramatically illustrative of the parallel connection of the input connectors 30 and 32. The output of the input connector box 86 is connected via a lead line 88 to the input of an output connector box 90 which is diagramatically illustrative of the parallel connection of the output connectors 34 and 36.

The input connector box 86 is adapted to receive the output from the output connectors of other talk line apparatuses via the connecting lead 52, while the output connector box is adapted to be connected via the lead 52 to the input connectors of other talk line multiple apparatuses 10. Thus, it will be seen that a plurality of the talk line apparatuses 10 are connected in a circular parallel configuration, so as to enable an individual to select any one of 24 separate and distinct talk line channels to converse with any other person disposed anywhere within a central telephone office on another talk line apparatus, provided that said other apparatus is tuned in to the selected talk line channel. In this regard, attention is directed to the fact that in many problems occurring in the central telephone office a supervisor or controlling person will request that a repairman standing somewhere within the frame structures check a certain line. Accordingly, the supervisor may request said repairman to communicate with him by stating that he answer on a selected channel, such as directing to the repairman to communicate with him by turning to channel 3. During the conversation between the controller and the repairman on the selected channel, channel 3, the controller may also request other repairmen to contribute or join in the conversation by directing them to tune in the talk line multiple apparatus at their position to the selected channel 3.

It is herein to be noted that all of the separate and distinct 24 communication channels may be employed as talk line channels or some may be employed as talk line channels while others of the channels may be employed as test channels. The selection of which of the channels are talk channels and which are test channels is predetermined but easily connectable due to the four wire input configuration. If any changes are subsequently desired, then the configuration can be varied by the selectible connection of the combined jack inputs 20, 22 to the rotary switch 16 and thus the input connectors 86.

It will thus be apparent to those skilled in the art, that the present invention provides a simple and relatively inexpensive apparatus requiring a minimal amount of space which may be conveniently positioned at various locations upon the various frame equipment of a telephone central office to enable the telephone personnel to simply and quickly communicate with one another and without having to wait for a talk line to become available.

While we have shown and described the preferred embodiment of our invention, it will be readily apparent to those skilled in the art that there are many modifications, changes and improvements which may be made in said invention without departing from the spirit and scope thereof, as discussed and described in the foregoing specification and drawings.

What is claimed is:

1. A talk line multiple communication and test apparatus comprising
   a housing,
   a face plate, and
   a switch member having a plurality of selectable switching positions,
   means for securing said face plate with respect to said housing,
   said switch member being disposed within said housing,
   at least one input jack connected with respect to said housing,
   connector means comprising at least one input connector and one output connector disposed within said housing and providing a plurality of individual communication channels,
   means for electrically connecting said input connector to said output connector,
   said input and output connectors being of the multi-terminal type which are adapted to receive mating multi-terminal type connectors in mating engagement therewith,
   a biasing member disposed within said housing between the interior of one of the walls thereof and in abutting engagement with one of the mated connectors and exerting a biasing force thereupon to maintain said mated connectors in secure mated engagement thereby ensuring electrical connection, said biasing member having a substantially rectangular configuration including a pair of side walls and a pair of end walls, each of said end walls having an opening formed therein, at least one of said openings being internally threaded, said biasing member including a threaded bolt, said bolt being disposed within said openings in threaded engagement with said threaded one of said openings, said bolt being operable upon rotational movement thereof to vary the spacing between said end walls to thereby regulate the longitudinal axial forces imparted to said side walls to selectively regulate the spacing between said side walls, means for electrically connecting said input jack to said switch member, and means for electrically connecting said connector means to said switch member to enable said switch member to be selectively connected with one of said individual communication channels to permit communication over said selected channel via said input jack.

2. A talk line multiple communication and test apparatus in accordance with claim 1, wherein said biasing member comprises
a substantially U-shaped member, and
an end cap member, said U-shaped member including a base portion forming one of said end walls and a pair of legs depending from said base portion, each of said legs forming one of said side walls, said end cap member having a substantially hollow rectangular configuration and forming the other of said end walls, and the ends of said legs remote from said base being positioned within the hollow of said end cap member.

3. A talk line multiple communication and test apparatus in accordance with claim 2, wherein the width of one of said legs is smaller than that of the other of said legs such that the lateral edges of one of said sidewalls is positioned inwardly of the lateral edges of the other of said side walls.

4. A talk line multiple communication and test apparatus in accordance with claim 3, wherein said remote ends of said legs of said U-shaped member are crimped inwardly towards one another, and said crimped ends being positioned within the hollow of said end cap member.

5. A talk line multiple communication and test apparatus in accordance with claim 4, wherein said switch member is of the rotary type and includes a rotary knob member, and said means for securing said face plate to said housing includes said rotary knob member.

6. A talk line multiple communication and test apparatus in accordance with claim 5, wherein said input jack includes a portion extending outwardly from said housing, said outwardly extending portion being threaded, a threaded nut, and said means for securing said face plate to said housing includes said threaded outwardly extending portion and said threaded nut disposed in threaded engagement therewith.

7. A talk line multiple communication and test apparatus in accordance with claim 6, wherein said apparatus includes a pair of input jacks, and said input jacks are connected as a single four wire input circuit.

* * * * *